(12) United States Patent
Murray

(10) Patent No.: US 11,538,030 B2
(45) Date of Patent: Dec. 27, 2022

(54) DISTRIBUTING PAYMENT KEYS AMONG MULTIPLE DISCRETE DEVICES IN A POINT OF SALE SYSTEM

(71) Applicant: Clover Network, LLC, Sunnyvale, CA (US)

(72) Inventor: Brian Jeremiah Murray, Mountain View, CA (US)

(73) Assignee: CLOVER NETWORK, LLC., Sunnyvale, CA (US)

( * ) Notice: Subject to any disclaimer, the term of this patent is extended or adjusted under 35 U.S.C. 154(b) by 1105 days.

(21) Appl. No.: 15/685,809

(22) Filed: Aug. 24, 2017

(65) Prior Publication Data

US 2019/0066103 A1    Feb. 28, 2019

(51) Int. Cl.
*G06Q 20/38*    (2012.01)
*G06Q 20/20*    (2012.01)
*G06Q 20/32*    (2012.01)

(52) U.S. Cl.
CPC ......... *G06Q 20/3829* (2013.01); *G06Q 20/20* (2013.01); *G06Q 20/322* (2013.01); *G06Q 20/3278* (2013.01); *G06Q 20/3827* (2013.01)

(58) Field of Classification Search
CPC ..................................................... G06Q 20/00
USPC .......................................................... 705/64
See application file for complete search history.

(56) References Cited

U.S. PATENT DOCUMENTS

| 4,200,770 | A | 4/1980 | Hellman | |
|---|---|---|---|---|
| 4,423,287 | A | 12/1983 | Zeidler | |
| 4,605,820 | A | 8/1986 | Campbell | |
| 8,578,467 | B2 * | 11/2013 | Ronda | H04L 63/0853 713/172 |
| 8,990,121 | B1 * | 3/2015 | Guise | G07F 7/0886 705/71 |
| 2008/0017712 | A1 * | 1/2008 | Hart | G06K 7/084 235/449 |
| 2009/0103725 | A1 * | 4/2009 | Tang | G06Q 20/18 380/45 |
| 2011/0246756 | A1 | 10/2011 | Smith | |

(Continued)

FOREIGN PATENT DOCUMENTS

WO    2016069775 A1    5/2016

OTHER PUBLICATIONS

Examination Report No. 1 from Australian Patent No. 2018200865.

(Continued)

*Primary Examiner* — Chinedu C Agwumezie
(74) *Attorney, Agent, or Firm* — Foley & Lardner LLP

(57) ABSTRACT

Methods and systems related to distributing payment keys to multiple discrete devices in a point of sale (POS) system are disclosed. One method includes storing a payment key on a first discrete device for a POS system and a public key certificate on a second discrete device for the POS system. The method also includes communicatively connecting the first discrete device with the second discrete device using a wire, transmitting the public key certificate from the second discrete device to the first discrete device using the wire, and verifying the public key certificate on the first discrete device. The method also includes finalizing a secure connection between the first discrete device and the second discrete device over the wire using a transport layer secure (TLS) protocol after the public key certificate is verified.

23 Claims, 7 Drawing Sheets

(56) References Cited

U.S. PATENT DOCUMENTS

| | | | |
|---|---|---|---|
| 2012/0054046 A1* | 3/2012 | Albisu | G06Q 20/20 |
| | | | 705/16 |
| 2014/0013406 A1 | 1/2014 | Tremlet | |
| 2014/0040149 A1* | 2/2014 | Fiske | G07F 7/127 |
| | | | 705/71 |
| 2014/0188732 A1 | 7/2014 | Kobres | |
| 2014/0289129 A1 | 9/2014 | Savolainen | |
| 2015/0106217 A1* | 4/2015 | Radu | G06Q 20/3227 |
| | | | 705/21 |
| 2016/0086172 A1 | 3/2016 | Kamal | |
| 2016/0224950 A1* | 8/2016 | Attar | G06Q 20/027 |
| 2018/0288062 A1* | 10/2018 | Goyal | H04L 63/0281 |

OTHER PUBLICATIONS

Final Office Action dated Mar. 9, 2020 from U.S. Appl. No. 16/502,637.
Examination Report dated Mar. 29, 2021 from European Application No. 18190601.7, 6 pages.
Examination Report No. 3 from Australian Patent No. 2018200865, dated Oct. 21, 2019, 5 pages.
Extended European Search Report for EP Patent Application No. 18190601.7, dated Nov. 30, 2018.
Examination Report No. 2 from Australian Patent No. 2018200865, dated Aug. 26, 2019, 3 pages.

* cited by examiner

600

DISTRIBUTING PAYMENT KEYS AMONG MULTIPLE DISCRETE DEVICES IN A POINT OF SALE SYSTEM

BACKGROUND

The sine qua non of the electronic payments industry is secure communication. Payment information needs to be transferred from a point of sale (POS) system to a payment processor via a secure channel that is protected from unscrupulous third parties. Unscrupulous parties may attack the system by eavesdropping on the channel and obtaining the payment information, or by spoofing the POS into setting up a secure channel with the third party instead of the intended payment processor. Therefore, the creation of a secure channel depends on both secure encryption and secure identity verification. The POS terminal and the payment processor must be able to verify their identities to each other and encrypt their communications in a manner that can be decrypted by their counterparty without exposing the overall payment system to attack. One way in which this is accomplished is through the distribution of asymmetric payment keys that are used to encrypt payment information at the POS for transmission through a network to a payment processor. The keys are distributed only to verified devices either locally in a secure key injection room or remotely by a process called remote key injection (RKI).

SUMMARY

This disclosure references discrete devices that include means for receiving payment information. Payment information includes account numbers, personal identification numbers (PINs), biometric information, passwords, or any other information that is used by a payment processor to authorize the transfer of funds from one entity to another. Common examples of payment information include 16-digit credit card numbers for credit card transactions and 4-digit PINs for debit card transactions. Means for receiving payment information include key pads for receiving PINs, bar code scanners (including QR code scanners), magnetic stripe readers (MSRs) for reading magnetically encoded account numbers, near field communication (NFC) readers for contactless payment processing, finger print readers, infrared surface or gesture analyzers, chip card readers, microphones for receiving auditory information, and other methods known in the industry. Devices that receive payment information generally also include injected payment keys that are used to encrypt payment information for transfer to a payment processor.

A single POS system can include multiple discrete devices. For example, a single POS system can include a merchant terminal with an MSR and another customer-facing mini-terminal with a key pad. Both discrete devices may accept payment information depending upon which checkout flow the operator uses. As another example, a single POS system could include: (i) a terminal for receiving input from a merchant operator to operate the POS system with common means for receiving payment information such as an MSR; (ii) and peripherals for less common means for receiving payment information such as NFC readers. POS systems with this characteristic allow POS manufacturers to provide merchants with a greater variety of potential POS systems with fewer devices in their product lines as individual merchants can mix and match to decide which means for receiving payment information they will offer their customers. The discrete devices can therefore be sold in individual packages for reassembly into a POS system after the various components are purchase by a single merchant.

POS systems with multiple discrete devices add a layer of complexity to the overall payment processing network of which the POS system is a part because secure communication must be established not only between a single device and a payment processor, but between the multiple discrete devices in the POS system itself. Notably, it is desirable to distribute payment keys to the multiple discrete devices to minimize transaction latency regardless of which of the discrete devices receives payment information from the customer. Although an additional layer of encryption, specific to the POS system, could be added to the encryption layer provided by the payment keys to facilitate the inter-system communication of payment information, merchants and customers are particularly sensitive to increases in transaction latency, and this additional layer of encryption is therefore less desirable. Therefore, in some approaches the additional discrete devices in a POS system add another element to the system to which payment keys need to be distributed. Furthermore, the multiple discrete devices are beneficially sold separately and reassembled by merchants in various combinations so a secure pairing between the multiple discrete devices cannot be implemented in the manufacturer's secure facility prior to when the devices are packaged and shipped. Therefore, the multiple discrete devices cannot be designed to recognized each other by a unique preprogrammed shared secret, and an additional identity verification process for the devices must be added to the system. Additionally, POS systems should not require a continuous connection to the Internet or other payment processing network because merchants want to be able to set up their POS systems and process payments regardless of any interruptions that the network might face. Therefore, any approach that allows for secure communication between the multiple discrete devices in a POS system should not rely on a connection to a separate server, such as RKI.

As shown in FIG. 1, POS system 100 could include a first discrete device in the form of a terminal with an MSR 101 for receiving payment information from a credit card 102, a second discrete device in the form of a receipt printer with an integrated NFC reader 103 for receiving payment information from device with an NFC antenna 104, and a wire connecting the two devices. The two devices could be packaged independently and sold to a single merchant. The merchant could then connect the two discrete devices with a wire, such as a universal serial bus (USB) cable. One of the discrete devices could include a payment key that was injected in a secure key injection facility or a network connection to receive a payment key from a secure server using an RKI procedure. As shown in FIG. 1, terminal 101 could include a stored payment key 105 that was injected at a manufacturing facility or received via a network connection 106. The first and second discrete device could then conduct a procedure over the wire in which the second device authenticates itself to the first device, and receives a copy of the payment key from the first discrete device over the wire. For example, terminal 101 could verify the identity of device 103 and provide a copy of payment key 105 to printer 103. The resulting POS system would then be able to encrypt payment information received via either of the two discrete devices for transmission to payment processing server 107 in encrypted form 108.

Various approaches disclosed herein are directed to specific technical solutions that implement the objective of the prior paragraph while at the same time mitigating or obviating the technical complexities and issues described above. Some of these approaches allow a POS system with multiple discrete devices to share payment keys amongst the various devices without a need to assure that the devices are matched with each other during reassembly into a unified POS system, or assure that the devices are connected to a server after reassembly. One such approach is a method for providing payment keys to a discrete device in a POS system. The method includes providing a first discrete device for a POS system with a stored payment key and providing a second discrete device for the POS system with a stored public key certificate and a corresponding private key. The method also includes connecting the first discrete device with the second discrete device using a wire. The method also includes transmitting the public key certificate from the second discrete device to the first discrete device using the wire. The method also includes verifying the public key certificate on the first discrete device and finalizing a secure connection between the first discrete device and the second discrete device over the wire using a transport layer secure (TLS) protocol after the public key certificate is verified. The public key of the public key certificate can be used to form the secure connection. The method also includes transmitting a copy of the payment key to the second discrete device over the wire using the secure connection.

Some of the approaches involve a POS system that comprises a first discrete device with a first means for receiving payment information, a second discrete device with a second means for receiving payment information, and a wire communicatively connecting the first discrete device to the second discrete device. The system also comprises a second memory system on the second discrete device, and a public key certificate and a corresponding private key stored in the second memory system. The system also comprises a first memory system on the first discrete device that stores instructions to: (i) receive the public key certificate from the second discrete device; (ii) verify the public key certificate; (iii) form a secure connection between the first discrete device and the second discrete device over the wire using a TLS protocol after the public key certificate is verified; and (iv) transmit a copy of a payment key to the second discrete device over the wire using the secure connection.

Some of the approaches involve a point of sale system that comprises a first discrete device with a first means for receiving payment information, a second discrete device with a second means for receiving payment information, and a wire communicatively connecting the first discrete device to the second discrete device. The system also comprises a secure connection between the first discrete device and the second discrete device over the wire using a TLS protocol. The system also comprises a second secure memory on the second discrete device that stores: (i) a public key certificate and a corresponding private key; and (ii) a copy of a payment key delivered from the first discrete device over the wire via the secure connection. The system also comprises a first secure memory on the first discrete device that stores: (i) a public key from the public key certificate after the public key certificate is verified; and (ii) the payment key. The secure connection is established by the first discrete device using the public key.

DETAILED DESCRIPTION

Methods and systems for sharing payment keys among multiple discrete devices in a POS system are disclosed. The approaches disclosed includes specific technical solutions that avoid the need for an additional layer of encryption of the payment information for each transaction, allow multiple devices in a POS system to have less robust security for long term storage of payment keys, assure that payments can be processed with reduced latency, allow multiple components of the POS system to be sold separately and combined in various combinations without being paired ex ante by a manufacturer, and assure that payments can be processed and keys can be shared without a connection to the Internet or any payment processing network. The specific technical aspects of the disclosed approaches, and the way these aspects solve the aforementioned technical problems, are described in detail below.

Figure 1:
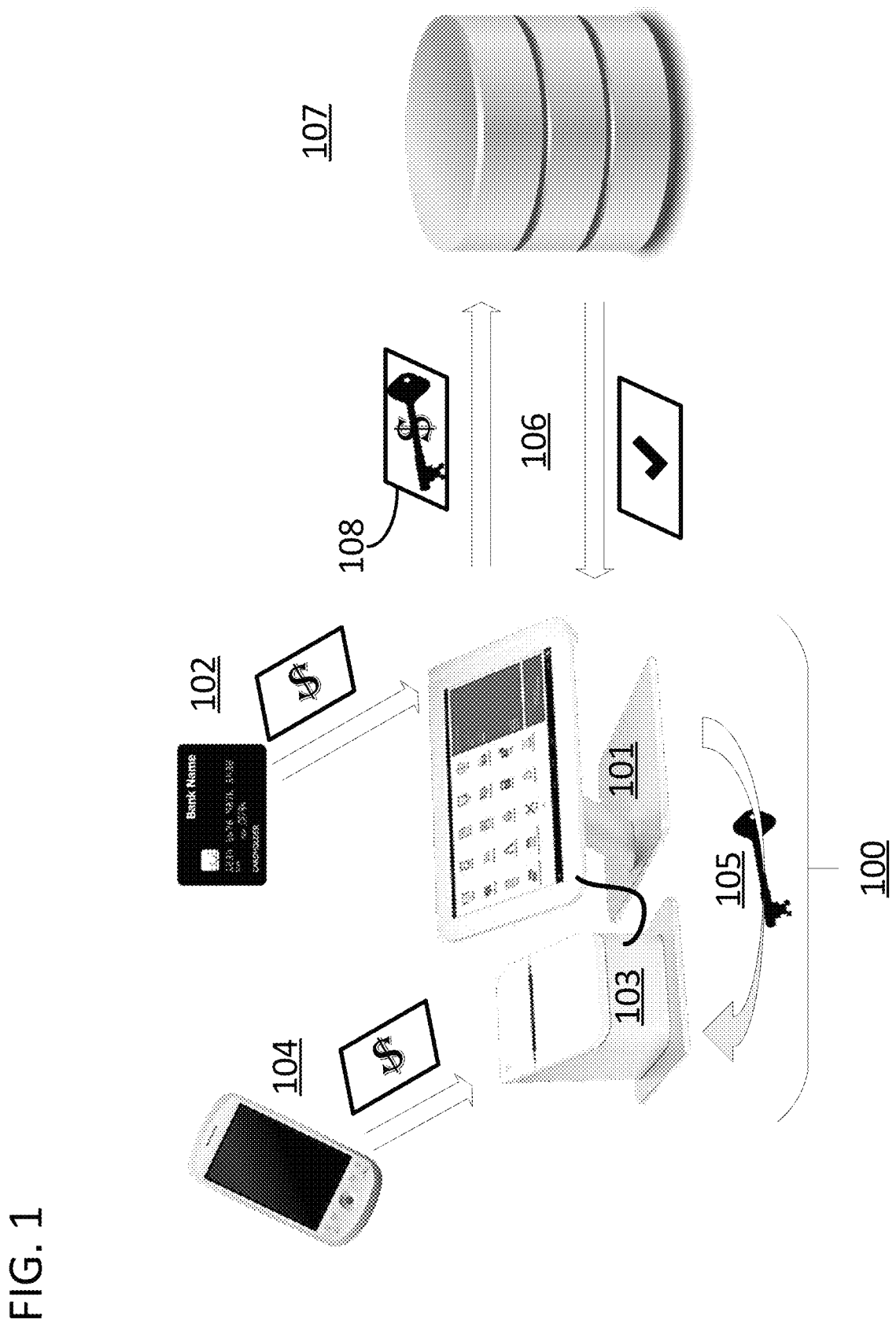
FIG. 1 illustrates a POS system with multiple discrete devices each of which includes means for receiving payment information for ultimate transmission to a payment processing server.
Figure 2:
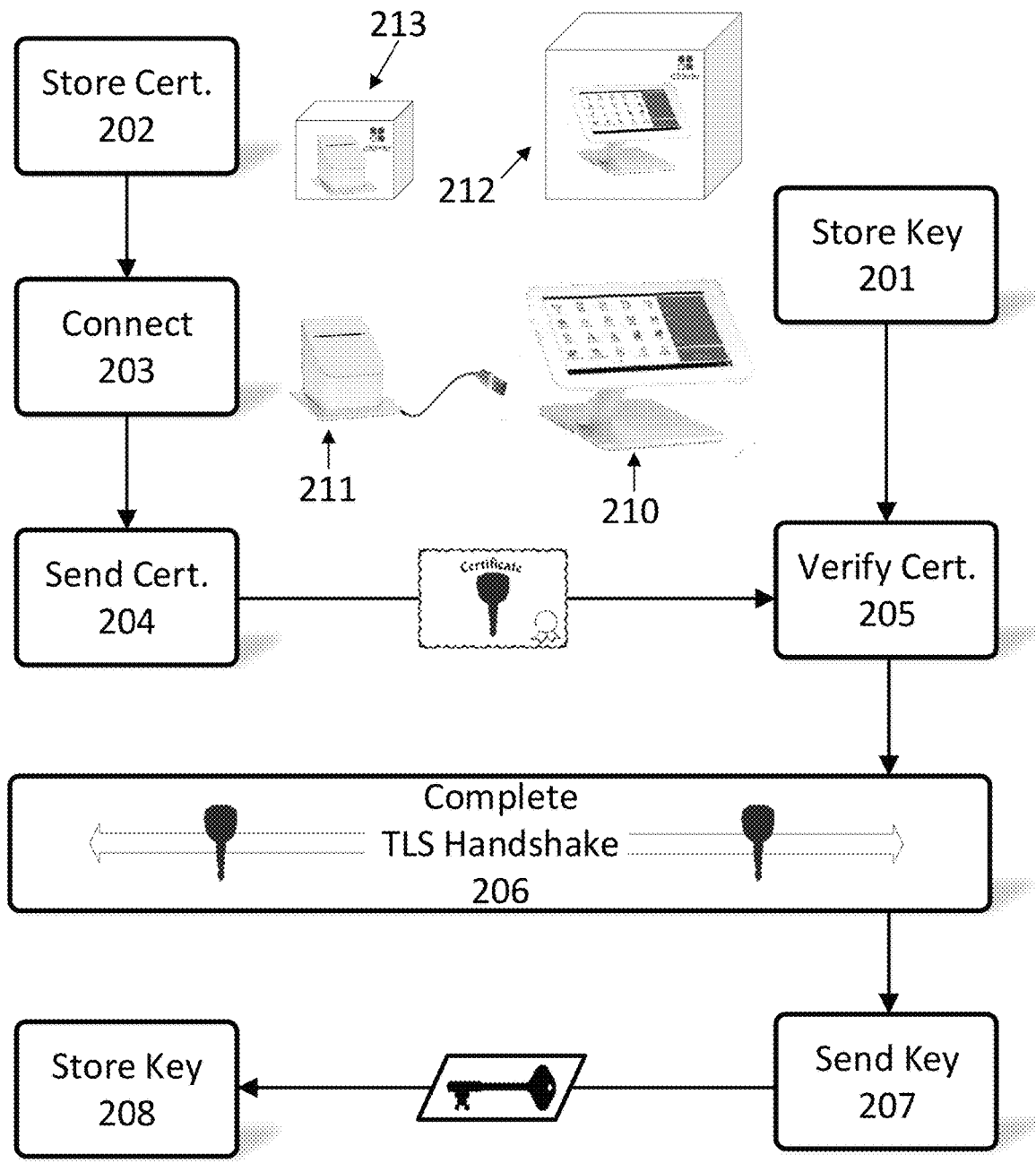
FIG. 2 is a flow chart for a set of methods of distributing a payment key from a first discrete device in a POS system to a second discrete device in the POS system.

FIG. 2 illustrates a flow chart 200 of a set of methods for distributing payment keys to multiple discrete devices in a POS system. Elements of the flow chart on the right side of flow chart 200 illustrate steps that are taken by a first discrete device in the POS system while steps on the left side of flow chart 200 illustrate steps that are taken by a second discrete device in the POS system. The first discrete device could be a terminal of the POS system. The terminal could include a register application for the POS system and could provide the main interface for the merchant operator of the POS system. The terminal could also include a means for receiving payment information such as an MSR for receiving credit card numbers from the magnetic stripe of credit cards. The second discrete device could be a peripheral with a means for accepting payment information such as a dedicated NFC reader, a customer-operator touch enabled LCD with a built in NFC reader, a receipt printer with a built in NFC reader, a basic key pad, or any other discrete device with its own means for accepting payment information. As illustrated, the first discrete device is a terminal 210 and the second discrete device is a receipt printer with a built in NFC reader 211. The first discrete device and second discrete device could be distributed in separate packages (e.g., 212 and 213) such that they were not uniquely paired by a manufacturer in a secure facility before being sent to a merchant end-user. However, using some of the methods of flow chart 200, the two devices could establish a secure connection for distributing payment keys after they were removed from there packages and connected by the merchant end-user.

The components of a POS system could be configured to execute the methods of flow chart 200 by storing various data structures and instructions in electronic memory. For example, the first discrete device could store a payment key, or set of payment keys as in step 201, and the second discrete device could store a public key certificate and a corresponding private key, as in step 202. The keys and public key certificates could be stored in secure memories of their respective devices. The secure memories could be configured to delete the keys or certificate if a tamper sensor indicated that the secure memory had been compromised. For example, the secure memories could be located within a physical tamper mesh that could not be pierced without sending a tamper signal to the secure memory, upon which the secure memory would delete its contents. The secure memory could also be secure in that it was only accessible to certain hardware elements on the device (e.g., a secure processor dedicated to handling payment information as opposed to an applications processor for handling all other aspects of the POS system).

The payment key could be a single payment key in a set of payment keys stored by the first discrete device. The payment keys could also be a key set for a Derived Unique Key Per Transaction (DUKPT) key management scheme as specified in ANSI X9.24 part 1. The payment keys, or derivatives thereof, could be utilized by the POS system to encrypt payment information received by the POS system for transmission in encrypted form to a payment processor.

The public key certificate could include a digital signature from a certificate issuer, and a public key or other payload. The certificate issuer could be a trust anchor of the POS system such as the payment processor. The public key certificate could also include an identity of the certificate issuer and an identity of the discrete device on which the public key certificate was stored. In specific approaches, the public key certificate could be a PKI certificate as defined by X.509 in RFC 5280. The public key certificate could be a 4096-bit or greater certificate.

The components of a POS system could be configured to execute the steps of flow chart 200 before being placed in their separate packages (e.g., 212 and 213). For example, a first discrete device could store a payment key that was injected in a secure key injection room at a manufacturer's facility before being packaged. The payment key could be stored in secure nonvolatile memory (NVM). Alternatively, the payment key could be stored in an external flash memory, or other NVM, and encrypted using a key-encrypting-key that was stored in a secure NVM. They payment key could alternatively be stored in volatile memory with an always-on power source such as a back-up battery. The payment key could be erased if the power source was interrupted. Likewise, the second discrete device could store a public key certificate and corresponding private key that were loaded into the device at the manufacturer's facility and could similarly be stored in NVM or volatile memory with an always-on power source. The always-on power source could be a backup battery used to store the public key certificate and corresponding private key.

Alternatively, the first discrete device could be configured to execute an RKI process with a server to receive payment keys after being packaged, shipped, received, and activated by a merchant end-user. This approach could be favored in approaches in which a payment processor that the merchant intended to communicate with using the POS system required payment keys to be specific to that merchant. In such a situation, the appropriate payment keys could be delivered to the device after the merchant purchased, unpacked, and switched on their POS system component for the first time. Devices configured for RKI will often include a serial number which is used to identified the device to the RKI server and an internal key stored in a secure memory that is uniquely configured to unlock the payment keys delivered from the RKI server. Regardless of the approach used to provide the key to the discrete device, the POS system will at one point execute step 201 of storing a payment key on a first discrete device, such as POS terminal 210. However, step 201 is placed midway between the unpacked and packed device to signify the fact that RKI may be necessary before the device can execute step 201.

Flow chart 200 continues from step 202 with a step 203 of connecting the first and second discrete devices. The step can be executed via a wire extending between ports on the two devices. In some approaches, step 203 and all of the subsequent steps in the flow chart can be execute without any connection to the Internet or another payment network. The steps can also be executed once, and only once, the first time a second discrete device is connected to the first discrete device. Alternatively, the steps can be conducted multiple times every time the two devices are connected. For example, the steps could be conducted every time the devices are powered up such that only one of the devices needed to persistently store the payment keys or repeatedly retrieve the payment keys from a remote location. In one class of approaches, the payment keys are stored only in volatile memory on the second discrete devices such that they must be redelivered from the first discrete device every time the second discrete device is turned on.

The wire used to communicatively connect the device in step 203 could be a USB cable. The two devices can include USB drivers used to communicate over the wire. The wire can be used as part of the secure connection between the two devices such that it can be used to execute the remaining steps of flow chart 200 as well as to carry encrypted payment information from the second device to the first device for further transmission to a central payment processor after the secure connection is established. The wire can also be used to transfer non-sensitive information between the two devices such as when a terminal indicates that it is time for a peripheral to conduct a payment information acquisition procedure or display an advertisement on a display of the peripheral. As the wire connects external ports of the discrete devices, the wire presents an attack surface for unscrupulous parties and transmissions of information across the wire should take this into account both before and after the secure connection is established.

Flow chart 200 continues from step 203 with a step 204 of sending a public key certificate from the second discrete device to the first discrete device. The public key certificate can be sent over the wire before the channel between the devices is secure because the key it transmits is public and because the digital signature of the certificate issuer cannot be copied and reused. The public key certificate can be an electronic document used to prove legitimate ownership of a public key or other payload used to establish a secure channel. The public key certificate can also include information about the key, the identity of the certificate holder, and the digital signature of the certificate issuer. The digital signature is unique to the certificate of which it is a part such that it cannot be copied and reused to verify the authenticity of another certificate. In certain approaches, the digital certificate is configured to achieve this result because the digital signature is derived from a hash of the certificate's contents. Since the contents uniquely identify the second discrete device and the issuer, the same signature could not be used to certify another certificate with a different discrete device.

Upon receipt of the digital certificate, the first discrete device will verify the certificate in step 205. The certificate can be verified by using a digital signature public key that is used to analyze the digital signature. For example, the digital signature could be a hash of the certificate's contents, and the digital signature public key could be applied to the signature and verify that the result matched the certificate's contents (e.g., the certificate issuer identity and the second discrete device identity). Through this process, the first discrete device will be able to verify that the second discrete device is a bona fide member of the POS system as designed by the manufacturer of the devices and authorized by the payment processor of the POS system.

The process continues with step 206 of finalizing a secure connection between the first discrete device and the second discrete device over the wire using a transport layer secure (TLS) protocol after the public key certificate is verified. The term finalizing is used here to refer to the fact that certain TLS protocol implementations include steps that are in accordance with steps 204 and 205 of FIG. 2 such that the TLS protocol has already been engaged at the commencement of step 206. For example, in certain approaches such as TLS 1.2, the first and second discrete devices will transmit key exchange messages to each other on a speculative basis before the certificates are verified. In certain approaches, the public key from the public key certificate, or other payload from the public key certificate, will be used to establish the secure connection. In certain approaches, the corresponding private key will also be used to establish the secure connection. Step 206 can include the first discrete device verifying the second devices' possession of a private key corresponding to the public key certificate via a challenge response. The terms TLS protocol is used in accordance with its standard usage in the industry and is not meant to refer specifically to the transport layer of the OSI model. In approaches in which the wire is a USB cable and the transport protocol is USB, the secure connection would be TLS over USB.

The TLS protocol used could be TLS 1.2 as used with a common core to TLS over TCP or TLS over Bluetooth. TLS would be beneficially applied in this application because it provides both data integrity and data authentication. In addition, it is a public standard that has thereby been vetted for security vulnerabilities. In specific approaches, the TLS block cipher is the Advanced Encryption Standard (AES)-256. AES-128 can also be used and has been associated with a measured 25% speed improvement over AES-256. However, the payment key issuer will generally require any cipher used to encrypt the key to offer at least as secure a level of encryption as the key itself offers. For PCI compliance, AES-128 is currently sufficient because the NIST SP 800-57 (part 1, rev 4) equates AES-128 with the Rivest, Shamir, & Adleman (RSA) 3072 block cipher used for PCI DUKPT payment keys. However, the level of encryption required may increase in the future. Therefore, use of AES-256 is likely to provide a system with longer useful life without upgrades. The handshake can involve the generation of a shared secret at both devices using a Diffie-Hellman key exchange. Specifically, the key exchange can be an Elliptic curve Diffie-Hellman Ephemeral (EcDHE) key exchange. In specific approaches, the cipher mode can be Galois/Counter Mode (GCM) to provide both encryption and data encryption. However, the cipher mode could also involve encryption via other means and the application of a hash-based message authentication code (HMAC) for data integrity.

Figure 3:
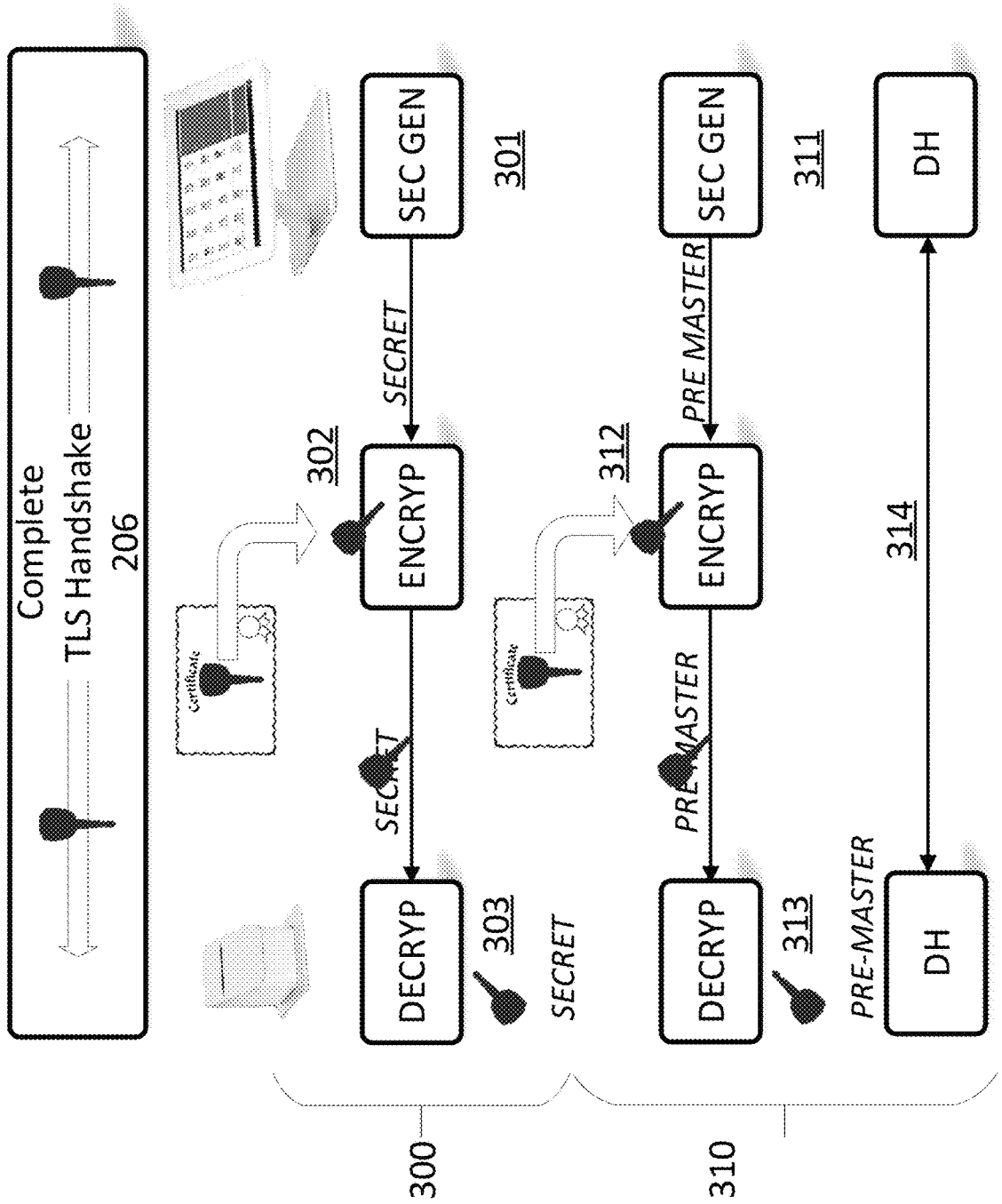
FIG. 3 is a flow chart for a set of methods for establishing a secure connection between two discrete devices in a POS system using a public key from a public key certificate held by one of the two discrete devices in the POS system.

The public key from the public key certificate, or other payload from the public key certificate, could be utilized during the TLS handshake to establish the secure connection. The corresponding private key could also be utilized during the TLS handshake to establish the secure connection. The handshake could involve the steps of agreeing on a key exchange procedure, exchanging the keys, encrypting data for transmission using the key, and verifying the integrity of the secure connection. FIG. 3 provides flow charts 300 and 310 which illustrate two potential corresponding methods that can be utilized as part of finalizing the secure connection. In flow chart 300, the first discrete device generates a secret in a step 301. The first discrete device then encrypts the secret with the public key from the public key certificate and transmits it to the second discrete device in a step 302. The second discrete device then decrypts the secret with the private key corresponding to the public key certificate in a step 303. As a result, the two devices have a shared secret in the form of a pre-master secret. The pre-master secret is then used to derive a secret key, via a pseudo-random function, to secure communications between the two devices. Flow chart 310 begins with similar steps with the exception that the first discrete generates a pre-master in step 311 and uses the public key to encrypt the pre-master in step 312. The second device then decrypts the pre-master using the private key corresponding to the public key certificate in a step 313. However, the pre-master is not used as the shared secret. Instead, the pre-master is then used as the seed for a Diffie Hellman style key exchange to generate a shared secret at both the first and second discrete devices as in step 314. The second approach provides forward secrecy in that even if the private key is compromised, data sent over the secure channel is not compromised.

Figure 4:
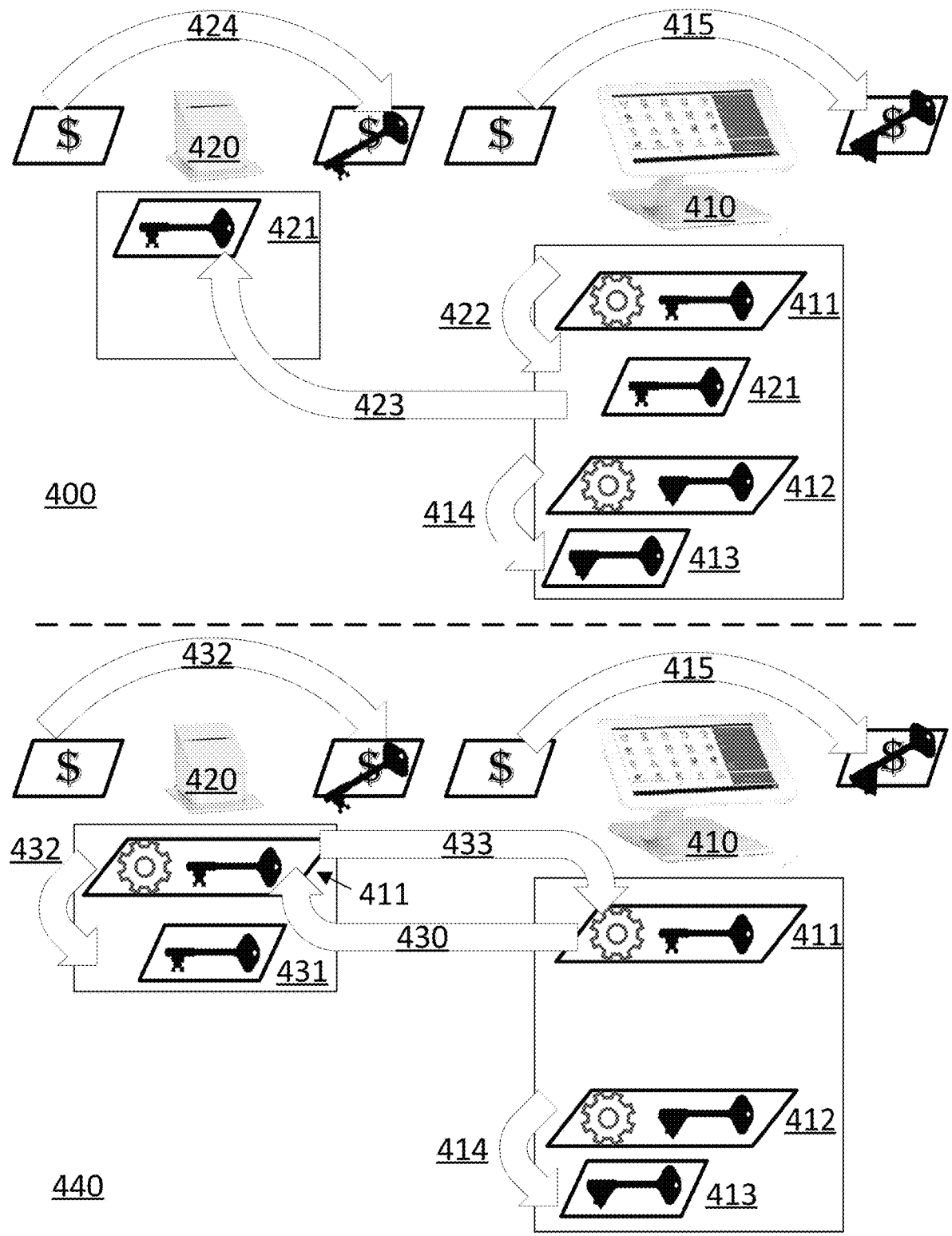
FIG. 4 illustrates two flow charts for two sets of methods for payment key management and payment key distribution in a POS system that has been securely connected using some of the approaches illustrated by FIG. 2.

Once a secure connection is created between two, or more, discrete devices in a POS system, the secure connection, or connections, between the devices can be used to distribute payment keys among the discrete devices in numerous ways. FIG. 4 illustrates two main classes of key distribution with two block diagrams 400 and 440. Each arrow in the flow diagram represents a method step that can be executed by the POS system to distribute and utilize the payment keys of the POS system. Generally, the POS system will include a first discrete device on which the payment key, or payment keys, are initially stored. In both of the illustrated cases, device 410 is a first discrete device for the POS system that stores a first payment key set 411 and a second payment key set 412. The payment key sets can include the payment keys and associated metadata used to identify the key during transactions and to determine what transforms to perform to derive a key for the next transactions. The payment key sets can be part of a DUKPT key management scheme and be used to generate a series of future keys that are used for specific transactions. The metadata can include a DUKPT shift register, a key serial number, a key pointer, and a key check value. The purpose of this approach is to prevent long term harm from the system by having one of the keys taken as each generated future key can only be used for a single illicit transaction if it is stolen. Also, in both cases, second payment key set 412 is used to generate a payment key 413 in a step 414 that is subsequently used to encrypt payment information received on a first means for receiving payment information in a step 415. Both the generation of the payment key and the encryption of the payment information can be conducted on a secure processor of the first discrete device.

The approaches of block diagram 400 and 440 differ in how payment keys are distributed to the second discrete device 420. In block diagram 400, a payment key 421 is generated on first discrete device 410 using payment key set 411 in a step 422. Then, a copy of payment key 421 is transmitted to second discrete device 420 over the secure connection in a step 423. The payment key can be transmitted along with a corresponding key serial number. Subsequently, payment key 421 can be used to encrypt second payment information received via a second means for receiving payment information on the second discrete device in a step 424. Step 423 can be continually repeated to deliver additional payment keys to second discrete device 420 to assure that keys are available when payment information is received. The repeated delivery of keys to the second discrete device before they are needed for a transaction can assure that transaction latency is minimized for transactions using the second discrete device. The keys can be provided after each use or they can be batch delivered. In certain embodiments, payment key 421, and possibly an associated key serial number, are all that is delivered to second discrete device 420, as the rest of the key set metadata is kept on first discrete device 410. As such, the state of the key set is only maintained on first discrete device 410.

In block diagram 440, a copy of payment key set 411 is delivered over the secure connection to the second discrete device 420 in a step 430. Subsequently, the copy of the payment key set is used to generate a payment key 431 in a step 432. The step can be conducted on a secure processor of the second discrete device. Payment key 431 can then be used to encrypt second payment information received on a second means for receiving payment information on second discrete device 420 in a step 432. The approach of block diagram 440 will also involve a step of synchronizing the payment key set 411 stored on device 410 with the copy of the payment key set on device 420 in a step 433. In certain embodiments, this will involve a synchronization of the entire key set, including the associated metadata, between the two devices. The synchronization step can occur after every transaction which uses the second discrete device.

In either approach described with reference to FIG. 4, the payment information encrypted by the second discrete device can be transmitted directly to a payment processor from the second discrete device 420, or it can be sent back over the secure connection to be transmitted to a payment processor by first discrete device 410.

The payment keys can be stored on second discrete device 420 in various kinds of memories and can be deleted in accordance with different signals and schedules. The copy of payment key 421, copy of the payment key set 411 and/or payment key 431 can be stored in volatile memory on second discrete device 420. In these approaches, the payment keys would be erased every time the second discrete device 420 was powered down such that they would need to be redelivered when the device was powered back up. The keys could also be stored on a memory that responds to a tamper sensor by deleting the keys. The approach of block diagram 400 could also be augmented with an additional step of erasing the copy of payment key 421 stored on second discrete device 420 if it was not used within a set period of time after being delivered. This approach would be beneficial in that the entire future key schedule of a DUKPT payment key set would not be exposed on the wire between the two discrete devices. However, problems could arise as this may lead to a large number of keys being requested and not used. Since DUKPT key derivation can cause a large number of writes in memory, such an approach could lead to wear leveling problems in the memory of the first discrete device and decrease the first discrete device's durability. Furthermore, DUKPT can be limited in the number of keys available per key set to roughly 1 million keys. As a result, if a device wastes keys, an additional RKI process may need to be repeated to load a new key set into the POS system.

The payment keys of the POS system can be distributed to the various components of the POS system from a central discrete device, such as first discrete device 410 in FIG. 4. As illustrated, first discrete device 410 includes two key sets and is configured to distribute keys in a point of sale system with two discrete devices total. However, the central discrete device could include any number of key sets and could be configured to provide keys to multiple discrete devices. In addition, different key sets can be reserved and distributed only to certain types of discrete devices (e.g., the central device could store a key set that was exclusively used for PIN encryption and would only be distributed to a PIN pad and a key set that was exclusively used for EMV chip encryption and would only be distributed to a chip reader). The keys can be distributed whenever other devices in the system power up and connect with the first discrete device or only once the first time another device in the system connects with the central discrete device.

The provisioning of keys to the other devices in the system can be gated using certificate revocation lists (CRL)s. For example, each time a second discrete device 420 requests the delivery of keys from the first discrete device 410, the discrete device could recheck the second discrete device's public certificate to see if a central administrator, such as the certificate issuer, had revoked the certificate. The list against which this check would be run can be referred to as a CRL. If the second discrete devices' certificate were on the CRL, the first discrete device could refuse to deliver the requested keys. This approach would prevent unscrupulous parties from gaining information regarding the encryption of the system after it was determined that a given certificate was being used to spoof the system.

In another set of approaches, payment keys do not need to be delivered to second discrete device 420. In these approaches, the secure connection used to send the encrypted payment keys could instead be used to directly send the payment information received by the second discrete device to the first discrete device in encrypted form. However, this approach would place a lot of reliance on the strength of the secure connection and its ability to keep information transmitted on the external wire between the devices safely. In these approaches, it would be necessary to assure that the security of the secure channel exceeded that afforded by the payment keys themselves.

Although the approaches above are mainly limited to examples in which the POS system includes two devices, any number of discrete devices could be added to the system using the disclosed approaches. For example, the additional devices could be added in a hub-and-spoke approach in which the first discrete device continued to distribute payment keys to additional devices. Alternatively, the additional devices could be added in a serial chain approach in which each additional device added to the system verified its identity to, and received a key from, the last entity in the chain. Indeed, any combination of serial and hub-based distribution could be combined to add additional devices using some of the disclosed approaches. However, the distribution of keys in the POS system may be rate limited to prevent too many keys being distributed through the system. Encryption system attacks are generally more likely to succeed if they are given many examples of what the encryption system produces. For example, one form of attack may obtain numerous public certificates, set up secure connections with the encryption system, and review the corresponding multitude of outputs of the encryption system to crack the encryption. To prevent such an attack from getting too many examples, the first discrete device could be configured to only release a fixed number of keys in any given period. For example, the first discrete device could be limited to releasing 10 DUKPT key sets in a day or 1,000 DUKPT future keys in a day. Furthermore, a server responsible for the POS system could log each set of paired devices upon a secure connection being set up between the devices. The server would then be able to scan for these kinds of attacks by checking to see if the same certificate is being used for multiple connections at the same time or how many times the same certificate has been used.

Figure 5:
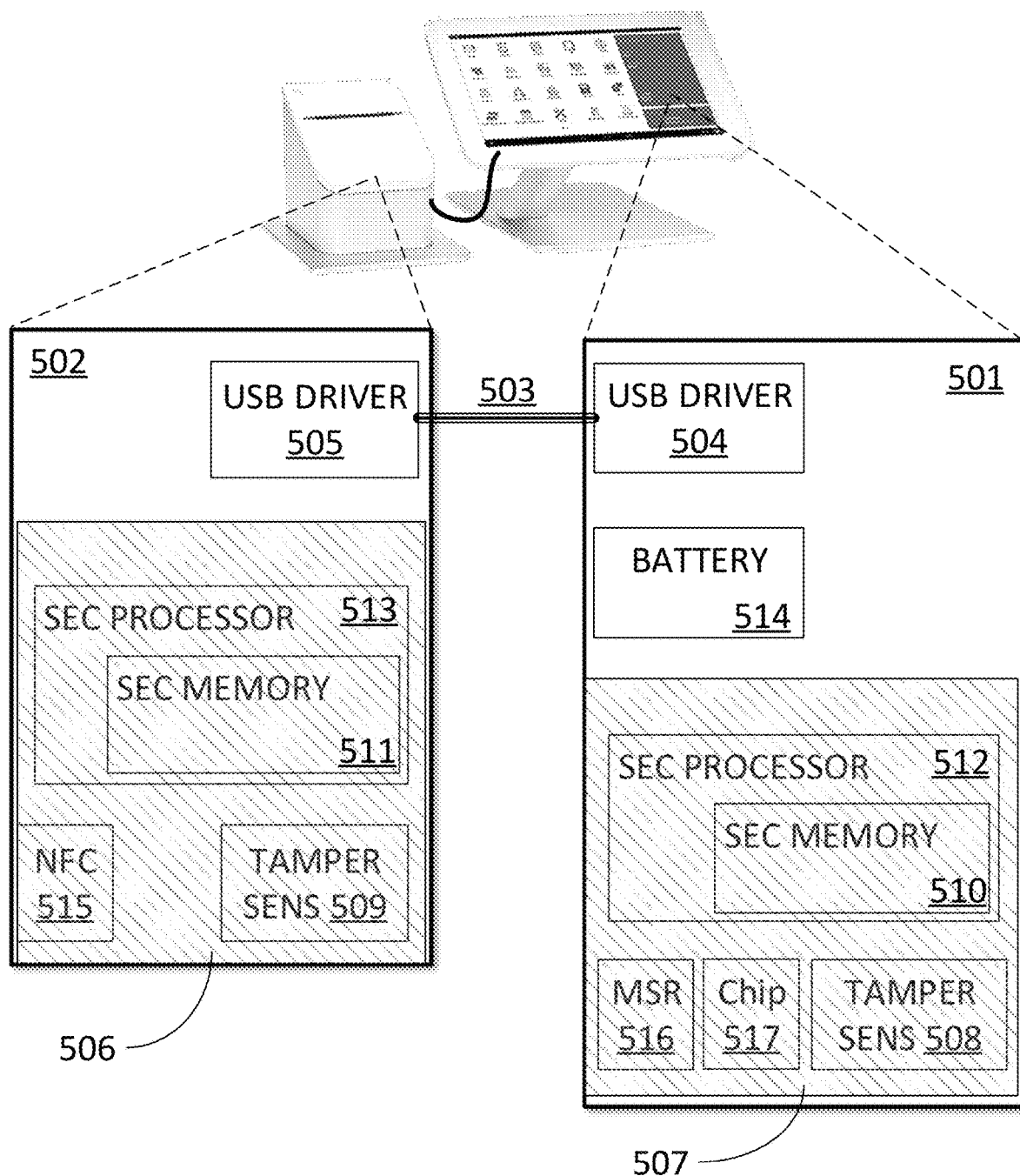
FIG. 5 is a block diagram of two discrete devices in a POS system that are configured to be securely connected in accordance with some of the approaches illustrated by FIG. 2.

FIG. 5 includes a hardware component diagram 500 that illustrates the components of a first discrete device 501 and a second discrete device 502 that can be used in accordance with some of the approaches disclosed herein. The two devices are communicatively coupled by a wire 503, which in this case is a USB connecting a first USB driver 504 on the first discrete device 501 to a second USB driver 505 on the second discrete device 502. A secure connection could be established over wire 503 in accordance with the approaches disclosed above with reference to FIG. 2. Keys could be distributed to second discrete device 502 using the secure connection in accordance with the approaches disclosed above with reference to FIG. 4. In certain approaches, the only unsecure information transferred over the wire 503 are GPIO interrupts sent to the processors on either device. The devices could be referred to as configured to execute various functions due to the fact that they store instructions in ROM, firmware, or other computer-readable storage media for executing those functions as well as the processors and other integral and/or auxiliary hardware components necessary to carry out those functions.

The devices each include a tamper mesh (506, 507) which is a physical cover that cannot be pierced after manufacture without causing a tamper sensor (508, 509) to trigger a tamper signal. The devices can both be configured to delete the contents of their secure memories (510, 511) in response to the receipt of that tamper signal. In particular, the devices could be configured to delete their stored payment keys in response to any detected tamper or other attack on the system that could jeopardize the payment keys.

Secure memories (510, 511) can be used to store data used in the execution of the methods disclosed above as well as computer executable instructions necessary to enable a processor to carry out the methods disclosed above. The secure memories 510 and 511 can be used to store the payment keys that are distributed through the system and secure memory 511 can be used to store the public key certificate of the second discrete device. The secure memories can take on various forms. As illustrated, they are drawn as being integrated with secure processors (512, 513). As such, they can include ROM, EPROM, or E²PROM memories integrated with the secure processors. For example, the secure memories could be a combination of ROM and embedded flash memory. The secure memories could store instructions for executing encryption algorithms that are meant for execution by secure processors 512 and 513 to perform the methods disclosed above. Indeed, the secure memories could store computer-readable instructions for performing any of the methods disclosed herein. Furthermore, the secure memories could comprise multiple components such as memory integrated on the secure processors as well as separate memories accessible to, but not integrated with the secure processors. The secure memories could be part of a memory system on each device that likewise included numerous physical components. First discrete device 501 also includes a back up battery 514 that is specifically responsible for maintaining power to secure components that require constant power such as tamper sensors and any volatile memory that stores injected payment keys.

Discrete devices 501 and 502 could also include any number of drivers for controlling means for receiving payment information. As illustrated, discrete device 502 includes an NFC driver 515, and discrete device 501 includes an MSR driver 516. Discrete device 501 could also include a chip card reader driver 517. The drivers could be located within the tamper mesh and could form a portion of the means for receiving payment information on each of the devices. Any number of other drivers could be added to each of the devices.

Figure 6:
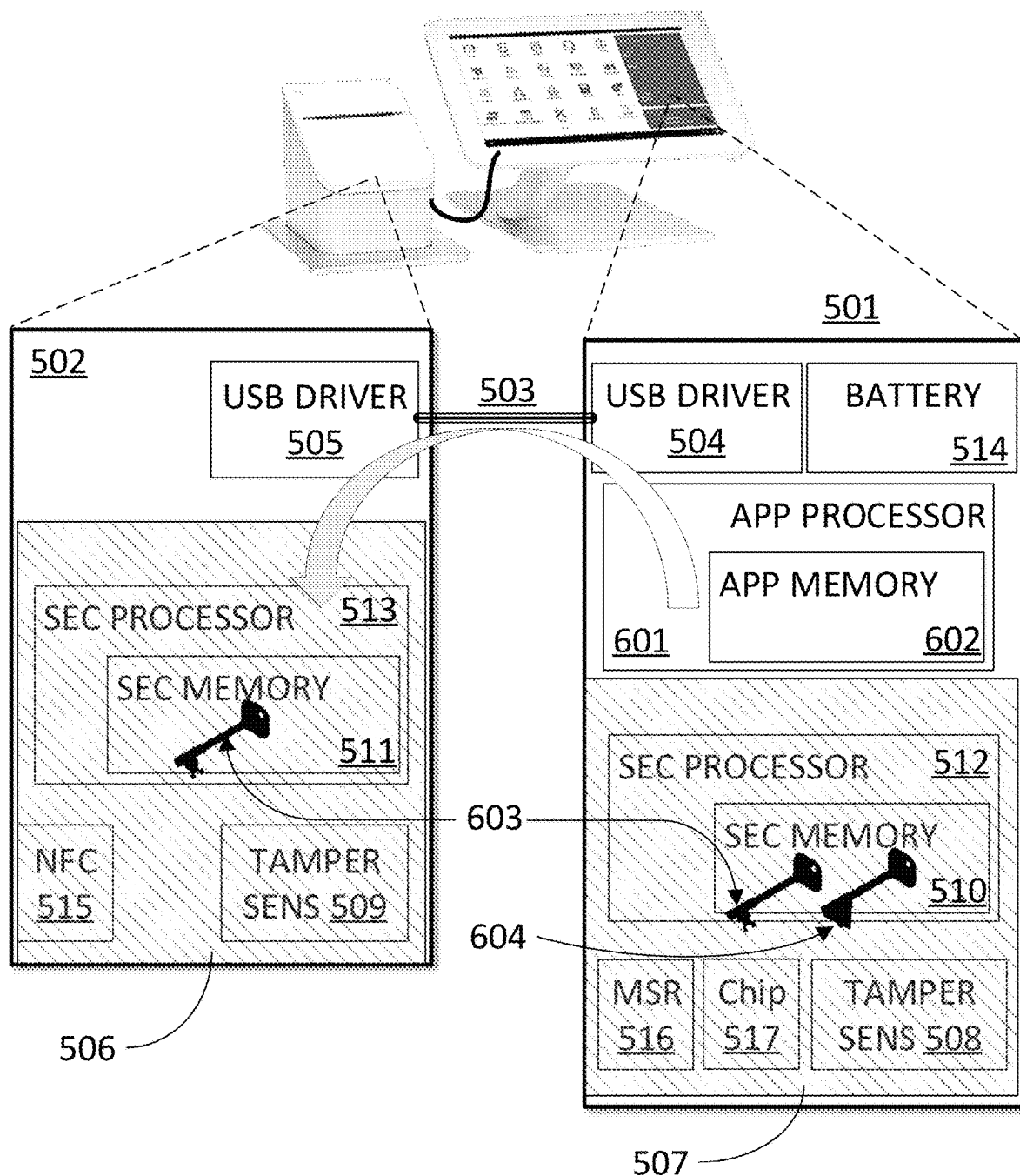
FIG. 6 is a block diagram of two discrete devices in a POS system, where one of the devices includes an applications processor and a secure processor, that are configured to be securely connected in accordance with some of the approaches illustrated by FIG. 2.

FIG. 6 includes a hardware component diagram 600 that includes many of the same components as component diagram 600. The main difference is that first discrete device 501 includes an applications processor 601 in addition to secure processor 512. The responsibilities of applications processor 601 and secure processor 512 could be split to allow for a secure but extensible POS system. Applications processor 601 could operate in combination with application processor memory 602 to instantiate an operating system such as Android or an equivalent. The operating system could provide a register application and other applications for the first discrete device. However, secure processor 512 could retain control of key management and payment information encryption. Secure processor 512 could have a higher level of security but with less functionality and configurability while applications processor 601 could be a consumer grade general microprocessor. Secure memory 510 would still be responsible for storing payment keys such as payment key 604 and payment key 603, and payment key 603 will still be transferred from secure memory 510 to secure memory 511. However, applications processor 601 can serve as an intermediary for their communication.

In certain approaches, both secure processor 513 and secure processor 512 will be servants of the applications processor 601. Applications processor 601 may connect to secure processor 513 over a secure connection provided by TLS over USB. The secure connection may include USB cable 503. Secure processor 512 may also connect to secure processor 513 over the same secure connection with applications processor 601 serving as a USB intermediary. In certain approaches the USB connection will tunnel through applications processor 601 and in other approaches each of the three processors will serve as USB endpoints. The connection between applications processor 601 and secure processor 512 may not be secured in the same way that the connection over wire 503 is secured. In particular, the connection between applications processor 601 and secure processor 512 may not use a TLS protocol and may instead rely on the security of applications processor 601 and secure processor 512 being housed in a single device. The housing for the device may include a tamper sensor in addition to the tamper sensor used for the secure mesh.

Figure 7:
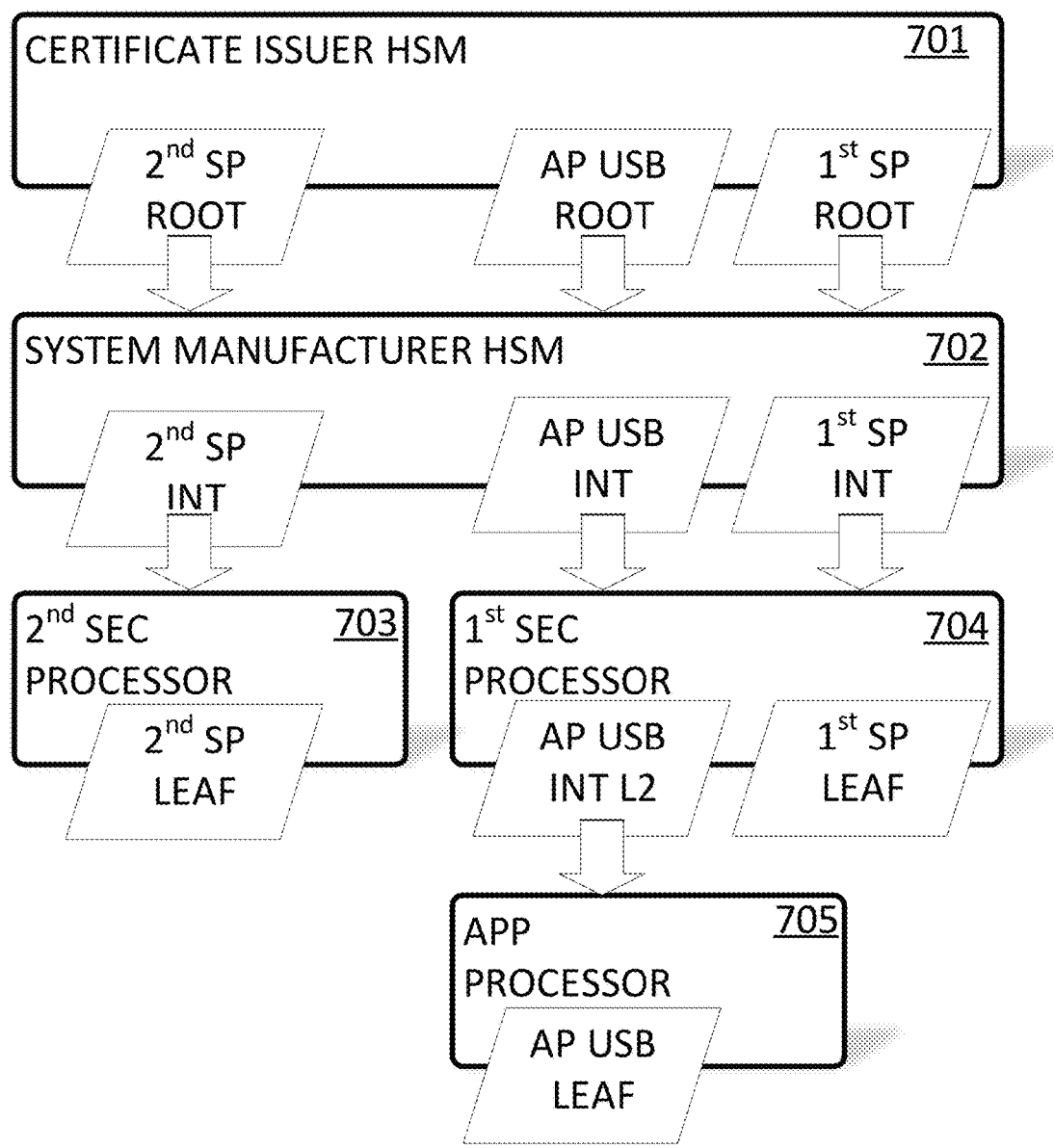
FIG. 7 is a block diagram of a certificate management system for a POS system that is in accordance with some of the approaches illustrated by FIG. 6.

FIG. 7 is a block diagram 700 of a certificate management system for a POS system that is in accordance with some of the approaches illustrated by FIG. 6. The diagram includes a certificate issuer hardware security module (HSM) 701 that generates a root certificate for the secure processor of the second discrete device, the applications processor of the first discrete device, and the secure processor of the first discrete device. The certificate issuer HSM can be administrated by a payment processor that provides payment keys. Those certificates are in turn distributed to and utilized by a system manufacturer HSM 702 and are utilized to generate intermediate certificates for the secure processor of the second discrete device, the applications processor of the first discrete device, and the secure processor of the first discrete device. The system manufacturer can then utilize those certificates to injects a leaf certificate in the second secure processor 703 and a leaf certificate for the first secure processor 704. The system manufacturer can also inject a second level intermediate certificate for the applications processor into the first secure processor 704.

As seen in FIG. 6, the applications processor might not be located within a tamper mesh of the first discrete device. Therefore, it may not be safe to store a long lived key or certificate on the applications processor. However, when the applications processor is an intermediary on the secure connection between the first secure processor and the second secure processor it may require a separate certificate. To address this issue, the secure processor on the first discrete device 704 can be configured to use the second level intermediate certificate for the applications processor to issue a leaf certificate to the applications processor 705. The leaf certificate issued to the applications processor 705 differs from the other leaf certificates in the block diagram because it is short lived. The first secure processor signs the short-lived certificate with the certificate that was issued in the secure room of the system manufacturer. The resulting short-lived certificate can be sent to a memory that periodically clears under the influence of a control signal, can be stored in volatile memory that clears every time the first discrete device is powered down, and/or can be added to a CRL to assure that it does not last on the applications processor for an extended period.

The cryptographic keys and algorithms used by the secure processors in this disclosure can be configured to perform various encryption standards and protocols including, but not limited to, AES, RSA, Digital Signature Algorithm (DSA), SQUARE, CRYPTON, Data Encryption Standard (DES), Triple Data Encryption Standard/Algorithm (TDES/TDEA), Blowfish, Serpent, Twofish, Threefish, Secure and Fast Encryption Routine (SAFER), International Data Encryption Algorithm (IDEA), Tiny Encryption Algorithm (TEA), extended TEA (XTEA), and others. The digital certificates can be NIST specified PKCs such as those specified in SP 800-32 or 800-25 or ITU-T REC-X.509.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network accessible memory. Although examples in the disclosure were generally directed to POS systems with two discrete, the same approaches could be utilized to share payment keys among a POS system with any number of discrete devices. Furthermore, any disclosure directed to a key in the singular form should be considered to include a set of keys that are used in combination such as via a DUKPT or other key management scheme. Furthermore, any disclosure directed to a wired connection could alternatively be applied to a wireless connection with certain modifications. For example, TLS over USB could be replaced with TLS over Bluetooth by changing the USB drivers to Bluetooth radios and making other changes. These and other modifications and variations to the present invention may be practiced by those skilled in the art, without departing from the scope of the present invention, which is more particularly set forth in the appended claims.

What is claimed is:

1. A point of sale system comprising:
a first discrete device with a first means for receiving payment information;
a second discrete device with a second means for receiving payment information;
a wire communicatively connecting the first discrete device to the second discrete device;
a second memory system on the second discrete device;
a public key certificate and a corresponding private key stored in the second memory system; and
a first memory system on the first discrete device that stores instructions to: (i) receive the public key certificate from the second discrete device; (ii) verify the public key certificate; and (iii) form a secure connection between the first discrete device and the second discrete device over the wire using a protocol after the public key certificate is verified;
wherein the first memory system and the second memory system store instructions to conduct a handshake for the protocol using a public key from the public key certificate and the corresponding private key.

2. The point of sale system of claim 1, wherein:
the first memory system stores instructions to transmit a copy of a payment key set to the second discrete device;
the second memory system stores instructions to derive a derived payment key from the copy of the payment key set;
the second memory system stores instructions to encrypt payment information received via the second means for receiving payment information using the derived payment key; and
the first memory system stores instructions to synchronize the payment key set and the copy of the payment key set using the secure connection.

3. The point of sale system of claim 1, wherein:
the first memory system stores instructions to transmit a copy of a payment key to the second discrete device over the wire using the secure connection;
the payment key is a derived payment key derived from a payment key set on the first discrete device;
the copy of the payment key is a copy of the derived payment key; and
the second memory system stores instructions to encrypt payment information received via the second means for receiving payment information using the copy of the derived payment key.

4. The point of sale system of claim 2, further comprising:
a volatile memory in the second memory system;
a nonvolatile memory in the second memory system that stores the public key certificate and the corresponding private key; and
a tamper sensor on the first discrete device;
wherein the first discrete device is configured to erase the payment key in response to the tamper sensor; and wherein the second memory system stores instructions to provide the copy of the payment key to the volatile memory when the copy of the payment key is received via the secure connection.

5. The point of sale system of claim 2, further comprising:
a first universal serial bus (USB) driver located on the first discrete device;
a second USB driver located on the second discrete device;
wherein the wire is a USB; and
wherein the secure connection is provided over USB between the first USB driver and the second USB driver.

6. The point of sale system of claim 2, further comprising:
a first secure processor on the first discrete device;
a first tamper mesh surrounding the first secure processor;
a second secure processor on the second discrete device;
a second tamper mesh surrounding the second secure processor;
a first secure memory on the first secure processor, wherein the first secure memory is a component of the first memory system, and wherein the first secure memory stores the payment key and a second payment key; and
a second secure memory on the second secure processor, wherein the second secure memory is a component of the second memory system;
wherein the second secure memory stores instructions to encrypt payment information received via the second means for receiving payment information using the copy of the payment key; and
wherein the first secure memory stores instructions to encrypt payment information received via the first means for receiving payment information using the second payment key.

7. The point of sale system of claim 6, further comprising:
an applications processor on the first discrete device;
wherein the first and second secure processors are slaves of the applications processor;
wherein the applications processor instantiates an operating system for the point of sale system;
wherein the wire is a universal serial bus (USB);
wherein the secure connection is provided over USB between the first secure processor and the second secure processor; and
wherein the applications processor is a USB intermediary on the secure connection.

8. A point of sale system comprising:
a first discrete device with a first means for receiving payment information;
a second discrete device with a second means for receiving payment information;
a wire communicatively connecting the first discrete device to the second discrete device;
a secure connection between the first discrete device and the second discrete device over the wire using a protocol;
a second secure memory on the second discrete device that stores: (i) a public key certificate and a corresponding private key; and (ii) a copy of a payment key delivered from the first discrete device over the wire via the secure connection; and
a first secure memory on the first discrete device that stores: (i) a public key from the public key certificate after the public key certificate is verified; and (ii) the payment key;
wherein the first secure memory and the second secure memory store instructions to conduct a handshake for the protocol using the public key from the public key certificate and the corresponding private key.

9. The point of sale system of claim 8, further comprising:
a first memory system on the first discrete device, wherein the first secure memory is a component of the first memory system;
a second memory system on the second discrete device, wherein the second secure memory is a component of the second memory system;
wherein the payment key is in the payment key set;
wherein the second memory system stores instructions to encrypt payment information received via the second means for receiving payment information using the copy of the payment key set; and
wherein the first memory system stores instructions to synchronize the payment key set and the copy of the payment key set using the secure connection.

10. The point of sale system of claim 8, wherein:
the payment key is a derived payment key derived from a payment key set on the first discrete device;
the copy of the payment key is a copy of the derived payment key; and
the second secure memory stores instructions to encrypt payment information received via the second means for receiving payment information using the copy of the derived payment key.

11. The point of sale system of claim 8, further comprising:
a second memory system on the second discrete device, wherein the second secure memory is a component of the second memory system;
a volatile memory in the second memory system that stores the copy of the payment key;
a nonvolatile memory in the second memory system that stores the public key certificate and the corresponding private key; and
a tamper sensor on the first discrete device;
wherein the first discrete device is configured to erase the payment key in response to the tamper sensor.

12. The point of sale system of claim 8, further comprising:
a first universal serial bus (USB) driver located on the first discrete device;
a second USB driver located on the second discrete device;
wherein the wire is a USB; and
wherein the secure connection is provided over USB between the first USB driver and the second USB driver.

13. The point of sale system of claim 8, further comprising:
a first secure processor on the first discrete device, wherein the first secure memory is on the first secure processor;
a first tamper mesh surrounding the first secure processor;
a second secure processor on the second discrete device, wherein the second secure memory is on the second secure processor;
a second tamper mesh surrounding the second secure processor;
wherein the first secure memory stores the payment key and a second payment key; and
wherein the second secure memory stores instructions to encrypt payment information received via the second means for receiving payment information using the copy of the payment key; and wherein the first secure memory stores instructions to encrypt payment information received via the first means for receiving payment information using the second payment key.

14. The point of sale system of claim 13, further comprising:

an applications processor on the first discrete device;

wherein the first and second secure processors are servants of the applications processor;

wherein the applications processor instantiates an operating system for the point of sale system;

wherein the wire is a universal serial bus (USB);

wherein the secure connection is provided over USB between the first secure processor and the second secure processor; and wherein the applications processor is a USB intermediary on the secure connection.

15. A method comprising:

storing a payment key on a first discrete device for a point of sale system;

storing a public key certificate and a corresponding private key on a second discrete device for the point of sale system;

communicatively connecting the first discrete device with the second discrete device using a wire;

transmitting the public key certificate from the second discrete device to the first discrete device using the wire;

verifying the public key certificate on the first discrete device; and finalizing a secure connection between the first discrete device and the second discrete device over the wire using a transport layer secure (TLS) protocol after the public key certificate is verified.

16. The method of claim 15, further comprising:

storing a payment key set on the first discrete device for the point of sale system;

transmitting a copy of the payment key set to the second discrete device over the wire using the secure connection;

generating a second payment key from the copy of the payment key set on the second discrete device for the point of sale system;

accepting first payment information on the first discrete device;

encrypting the first payment information using the payment key;

accepting second payment information on the second discrete device; and encrypting the second payment information using the second payment key.

17. The method of claim 16, further comprising:

generating the payment key from a second payment key set on the first discrete device for the point of sale system;

the payment key set and the second payment key set are derived unique key per transaction (DUKPT) payment key sets.

18. The method of claim 17, further comprising:

deleting the copy of the payment key set on the second discrete device when the second discrete device is powered down; and transmitting a second copy of the payment key set to the second discrete device over the wire using the secure connection when the second discrete device is powered on again.

19. The method of claim 15, further comprising:

generating the payment key on the first discrete device from a derived unique key per transaction (DUKPT) key set;

transmitting a copy of the payment key to the second discrete device over the wire using the secure connection;

generating a second payment key on the first discrete device from a second fixed DUKPT key set;

accepting first payment information on the first discrete device;

encrypting the first payment information on the first discrete device using the second payment key;

accepting second payment information on the second discrete device; and encrypting the second payment information on the second discrete device using the copy of the payment key.

20. The method of claim 19, further comprising:

deleting the copy of the payment key on the second discrete device if the copy of the payment key is not used within a set period of time subsequent to being transferred from the first discrete device.

21. The method of claim 19, further comprising:

detecting a tamper on the first discrete device; and deleting the payment key in response to the tamper being detected;

wherein the second payment key is stored in volatile memory on the second discrete device.

22. The method of claim 15, further comprising:

generating the payment key on the first discrete device from a fixed derived unique key per transaction (DUKPT) key set and using a first secure processor on the first discrete device;

accepting payment information on the second discrete device; and encrypting the payment information on the second discrete device using a copy of the payment key and using a second secure processor on the second discrete device;

wherein the wire is a universal serial bus (USB);

wherein the secure connection is provided via TLS over USB between the first secure processor and the second secure processor; and wherein the secure connection is formed using a public key from the public key certificate and the corresponding private key.

23. The method of claim 22, wherein:

the secure connection includes an applications processor serving as a USB intermediary; and the first secure processor and the second secure processor are servants of the applications processor.

* * * * *